United States Patent Office 3,009,098
Patented Nov. 14, 1961

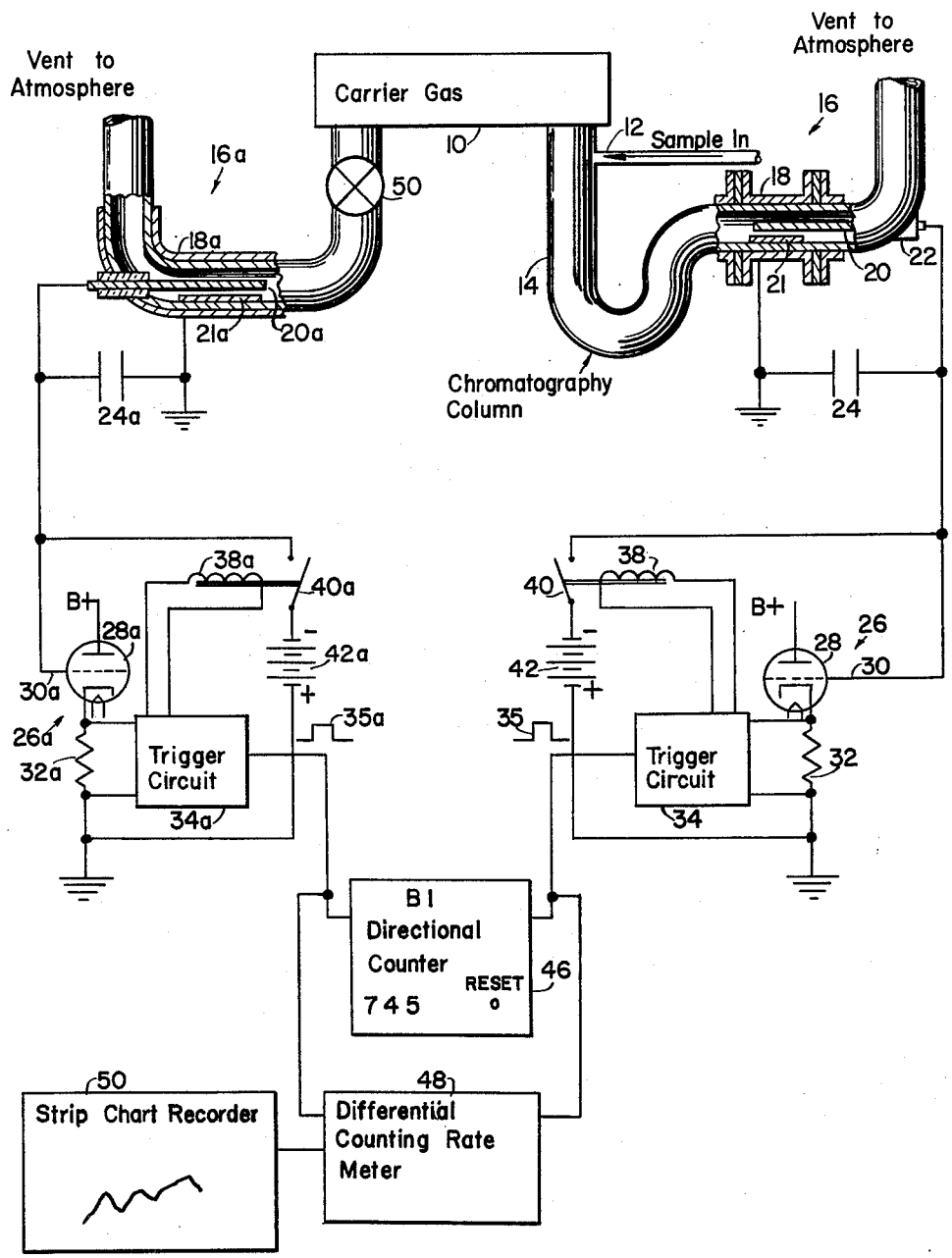

3,009,098
ELECTRICAL APPARATUS FOR
ANALYZING GASES
John C. Simons, Jr., Belmont, Mass., assignor to National Research Corporation, Cambridge, Mass., a corporation of Massachusetts
Filed Aug. 15, 1958, Ser. No. 755,178
9 Claims. (Cl. 324—33)

This invention relates to measuring and more particularly to the measurement of the amount of one gas in another gas.

The principal object of the present invention is to provide a measuring apparatus of the above type wherein the amount of sample gas, for example in a carrier gas, can be detected with a simple, reliable apparatus.

Another object of the invention is to provide an apparatus of the above type which will give digitalized information as a direct result of the detection and measurement of the quantity of sample gas.

Still another object of the invention is to provide an apparatus and method of the above type which is capable of providing information as to the proportionate amounts of gases that sequentially pass through a detection chamber in binary combinations of these gases with a carrier gas.

Another object of the invention is to provide an apparatus of the above type which is particularly suited for use in chromatographic analysis of a chemical sample, the apparatus providing several methods of display of information corresponding to the proportionate quantities of the various constituents in the sample.

Other objects of the invention will in part be obvious and will in part appear hereinafter.

The invention accordingly comprises the method involving the several steps and the relation and the order of one or more of such steps with respect to each of the others and the apparatus possessing the construction, combination or elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing which is a diagrammatic, schematic view of one embodiment of the invention.

The present invention is particularly applicable to the chromatographic analysis of gases, and accordingly the invention will be initially described in connection with its use in conjunction with chromatographic analysis. In chromatographic analysis the sample gas and a carrier gas pass through a chromatographic column wherein the various constituents of the sample require different lengths of time to pass through the column. Accordingly, the gas stream emanating from the column contains the carrier gas and the various different constituents of the sample separated sequentially. Recently ionization techniques have been developed for ionizing the binary combinations of gases coming out of the column and recording ion currents corresponding to these binary combinations. Such systems provide information in analog form. In the present invention, the ion current corresponding to the given binary combination of sample constituent and carrier gas is detected as a digital signal and is utilized as a digital signal to operate counter circuits, strip chart recorders and other signal output devices.

In order to achieve the creation of a digital signal corresponding to the concentration of a sample constitutent in the carrier gas, the gas is ionized and the resulting ion current is employed to discharge a capacitor at a rate which is a direct function of the ion current. When the capacitor has been discharged to a predetermined voltage, it is recharged to its initial voltage and then again discharged by the ion current. The frequency with which the capacitor is recharged is accordingly a direct measure of the ion current. This frequency, since it uses a number of spaced pulses, is also a digital signal which can be employed to operate a counter or the like digital recorder.

For ultimate sensitivity of chromatographic apparatus, the change in ion current corresponding to presence of the sample may be a very small fraction of the total ion current continuously generated in the detector due to the presence of the carrier gas. In order to compensate for this carrier gas signal, the apparatus is provided with means for generating a digital signal corresponding to the ion current in the carrier gas but opposite in "sign" to the digital signal corresponding to the ion current resulting from the ionization of the mixture of sample constituent and carrier gas. This carrier gas signal is then "subtracted" from the other signal to give a net digital signal which is dependent only upon the sample constituent. One type of method of generating a carrier gas signal is a stable pulse generator such as a multivibrator whose frequency can be adjusted to equal the frequency of the ionization detector, when only the carrier gas is passing through the ionization chamber. However, a preferred type of means of generating the carrier gas signal is to provide a second ionization chamber identical with the sample detection chamber, the second chamber containing only carrier gas. This preferred system is described hereinafter.

In order to understand more fully the present invention, reference should be had to the following detailed description in conjunction with the drawing. In the drawing a flow of carrier gas, e.g. helium, hydrogen or argon is provided from a carrier gas source 10. A chemical sample is injected into the carrier gas stream by means of a sample injection means 12 and the carrier gas flushes the sample through a chromatography separation means 14, (e.g. a displacement or elution column). The outflow from the separation means flows through a detector generally indicated at 16 and is then discharged to the atmosphere. The detector comprises an ion chamber, two electrodes 18 and 20 and a source 21 of a steady flux of ionizing particles. The ionizing particles are sufficiently energetic to create ions related to the composition of the gas passing through the chamber. In this embodiment the negative electrode 20 (positive ion collector) is a probe in the center of the flow of gases. The positive electrode 18 of the pair here comprises a part of the housing of the detector ion chamber. The source of ionizing particles 21 is solid radioactive materal (e.g. radium) which emits a flux of ionizing alpha or beta particles. The electrodes 18 and 20 also form a capacitor of a definite capacitance. An additional capacitor, schematically shown at 24, can be connected in parallel with the electrodes to increase their inherent capacitance. The positive electrode 18 is maintained at a ground potential in this embodiment and the negative electrode 20 passes out of the ion chamber through an insulator 22 and is connected to a voltage sensor 26, comprising electrometer tube 28, used to determine the electrical charge on the capacitor.

The potential across the capacitor 24 (in parallel with the ion chamber capacitance 18—20) decreases as positive ions are collected and neutralize the charge. The negative electrode 20 of the ion chamber and one side of capacitor 24 are connected to the grid 30 of the tube 28. The plate of the tube is connected to a positive potential and the cathode is connected through a resistor 32 to ground. A trigger circuit 34 is provided which operates when a predetermined potential is generated across the resistor 32. This potential is created when the tube becomes sufficiently conductive, which occurs when enough positive ions are collected on electrode 20 so as to raise the potential of the grid a sufficient amount. The physical constants of the circuit are so selected that the trigger circuit operates before the voltage across the electrodes decreases sufficiently to permit recombination of the ions in the ion chamber. The trigger circuit 34 actuates a relay solenoid 38 which holds a switch 40 closed for an instant during which time a negative voltage source 42 is connected to the negative electrode 20.

The apparatus thus far described comprises a means for causing a capacitor discharge and recharge cycle to occur as a function of the number of ions formed in a flowing gas stream. In use under normal gas chromatography conditions, this apparatus should be capable of frequencies of operation between 100 cycles and 10 kilocycles per second to permit accurate resolution of the gases as they flow. A signal voltage pulse 35 is generated to indicate the occurrence of each cycle by a signal pulse generating means which is preferably a part of the trigger circuit 34 used for controlling the capacitor recharge. Each signal pulse is fed to a bi-directional counter 46 which is preferably equipped with a numerical display means and a reset means.

To the bi-directional counter is also fed a train of reference pulses represented by 35a flowing from a carrier gas compensating means. In this embodiment a flow of carrier gas from the carrier gas source 10 is maintained through an ion chamber 16a and thence to the atmosphere. A flow regulation means 50 is provided to permit adjustment of the density of carrier gas in the ion chamber 16a, so that it is about the same as the density of the carrier gas in the sample chamber. The ion chamber 16a is preferably identical to the detector ion chamber 16 previously described. It comprises a positive electrode 18a forming part of the walls of the chamber, a radioactive source of ionizing particles 21a and a negative electrode 20a protruding into the chamber through appropriate insulation 22a. Associated with ion chamber 16a is an identical electrical system including capacitor 24a, sensor means 26a (including tube 28a having a grid 30a) cathode resistance 32a, trigger circuit 34a, solenoid 38a, switch 40a and power supply 42a.

The bi-directional counter 46 accepts the "add" pulses 35 and the "subtract" reference pulses 35a (from trigger circuit 34a) and keeps a running total of the algebraic sum of these pulse trains. The electrical circuit associated with ion chamber 16a is then adjusted so that, before a sample component is injected in means 12 into the carrier gas flow through the detector ion chamber 16, the algebraic sum of the two pulse trains remains constant. The counter reading (and therefore the numerical display) is then set at zero. After all of one sample component has passed through the detector chamber 16 the counter is read. When a proportionality factor is applied to the reading, a quantitative measurement of the amount of sample component which passed through the detector ion chamber is obtained.

Automatic means can be utilized to measure each component separately. One means involves pre-set time sequencing. In the method utilizing this means the start and stop instants for summation of the pulse differences are determined with respect to the periods when each of the various components are present in the flow through the detector; the counter is equipped to print out automatically a summation for each period as it occurs with reference to an appropriate schedule.

Another means for determining the periods for measurement is an analyzer which determines the end of the ionizing of each sample component when the rate of change of the algebraic sum of the two pulse trains approaches zero. A suitable analog differentiating circuit to detent the minimum of an analog curve of the difference between the two pulse train rates is adequate for this purpose, such an analog differentiating circuit (not shown) is preferably fed from a differential counting rate meter 48. In this fashion the print out mechanism is rendered operative upon reaching a minimum analog signal following a maximum analog signal.

The apparatus described above gives accurate, quantitative data regarding the amount of various constituents in the sample. However, it presents the information in a form which is unfamiliar to analytical chemists. In order to assure that adequate resolution of the various constituents in the sample is being obtained, analytical chemists prefer strip chart presentation of the numerical values corresponding to the quantities of the various constituents. The strip chart presentation of information is very conveniently and cheaply obtained in the present invention by the use of differential counting rate meter 48 which is a form of digital-to-analog converter which provides a signal in appropriate analog form for operation of a simple strip chart recorder 50. In a preferred embodiment of the invention, the differential counting rate meter can conveniently and simply be made to provide a logarithmic signal wherein the output trace in the strip chart recorder is proportional to the logarithm of the differential rate. This has the advantage of expanding the lower level signals and compressing the high level signals, thereby containing the entire trace without need for range switching. The resolution of the whole apparatus is accordingly extremely simple to determine with this type of presentation. Thus, the strip chart recorder gives entirely adequate accurate information as to resolution while the bi-directional counter 46 (or its associated printout device) gives extremely accurate quantitative data.

When a printout device is used in conjunction with the strip chart recorder, it is desirable that an indication of its operation be fed into the strip chart recorder so that an appropriate symbol is imprinted on the chart at the same instant that the number is printed out. Thus the operator has an excellent check of the quantitative data against the qualitative location of the corresponding graphical representation of the data on the chart. This can be done by a separate recording means on the chart, or by interposing a small identifiable pulse on the signal trace.

While one preferred embodiment of the invention has been described, numerous modifications can be employed without departing from the spirit of the invention. For example, numerous methods of recharging the capacitor can be employed other than those shown. The system can be made completely electronic by the use of suitable switching tubes and the like. Instead of a batteries 42 and 42a, any suitable pulse forming networks can be employed as is obvious to one skilled in the art. The capacitor 24, which is illustrated as being in parallel with the capacitance of the ion chamber is eliminated in those cases where the recycle rate is made very rapid. This will depend upon the geometry of the ion chamber, the size of the sample, and the flow rate of the sample. The particular requirements for a given system will naturally be controlled by the use to which the system is to be put.

Numerous ionizing means may be employed, such as beta ray emitters, for example Krypton 85 and tritium. Numerous alpha particle emitters such as radium and other radioactive isotopes can be employed. While gamma rays will have some ionizing effect, their health hazard is such that it is preferred that sources of alpha or beta particles be employed for ionizing the gas to be analyzed. Since the ionization current is a measure of the density of the gas, it is essential that both ion chambers 16 and 16a be maintained at the same pressure and temperature. This is conveniently done by placing both of them in the same oven, for example, if the gas analysis is to be made at elevated temperatures.

Since certain changes may be made in the above apparatus without departing from the scope of the invention herein involved, it is intended that all matter contained in the above description, or shown in the accompanying drawings, shall be interpreted as illustrative, and not in a limiting sense.

What is claimed is:

1. Apparatus for analyzing gas samples comprising a chromatography device for separating the constituents of the gas sample into sequentially arranged binary combinations of sample constituent and a carrier gas, an ion chamber for ionizing the gas flowing therethrough, a capacitor, means for charging the capacitor to a predetermined voltage, a positive ion collector in the ion chamber connected to the capacitor for discharging the capacitor at a rate directly related to the intensity of the positive ion current, means for energizing the charging means when the capacitor voltage has fallen to a predetermined value, means for counting the number of times the capacitor is recharged, and means for feeding to the counting means a signal train of counts corresponding to the positive ion current produced by the carrier gas alone, the counting means being arranged to give an indication of the accumulated difference between the capacitor recharging counts and the signal counts corresponding the flow of carrier gas.

2. Apparatus for analyzing a binary combination of sample constituent and a carrier gas, said apparatus comprising a pair of ion chambers, the first of said ion chambers comprising means for introducing a mixture of sample constituent and carrier into said chamber and means within said chamber for ionizing said mixture, the second of said ion chambers comprising means for introducing the carrier gas alone into said chamber and means within said chamber for ionizing said carrier gas, each ion chamber having associated therewith a capacitor, means for charging the capacitor to a predetermined voltage, a positive ion collector in the ion chamber connected to the capacitor for discharging the capacitor at a rate directly related to the intensity of the positive ion current, and means for energizing the charging means when the capacitor voltage has fallen to a predetermined value, each said energizing means providing a train of pulses corresponding to the frequency of operation of the energizing means, and counting means for indicating the accumulated difference between the number of pulses generated by the gas stream containing the sample constituent and the number of pulses generated by the carrier gas alone.

3. The apparatus of claim 2 wherein each ion chamber includes a radioactive source of ionizing agents for ionizing the gas therein.

4. The apparatus of claim 2 wherein each said capacitor is formed by the capacitance between the positive ion collector and another electrode in the ion chamber.

5. The apparatus of claim 2 wherein each said capacitor is formed by the capacitance between the positive ion collector and a wall of the ion chamber.

6. The apparatus of claim 2 wherein the counting means includes a print-out mechanism and a means for controlling the print-out mechanism as a function of a minimum signal following a peak signal from a differential counting rate meter.

7. The apparatus of claim 2 wherein a differential counting rate meter is provided for converting the two pulse trains into one analog signal corresponding to the difference in pulse rates of the two pulse trains.

8. The apparatus of claim 2 wherein a differential counting rate meter is provided for converting the two pulse trains into one analog signal corresponding to the difference in pulse rates of the two pulse trains, and a strip chart recorder is provided for plotting said analog signal with logarithmic presentation of the amplitude of the signal.

9. The apparatus of claim 2 wherein the counting means comprises a bi-directional counter which counts each pulse in one train of pulses as a positive and counts each pulse from the other train as a negative with means for maintaining a running algebraic sum of the counts in the counter, and means for zeroing and recording the counter readings at given times as the trains of pulses flow so as to obtain a count of the difference in the number of pulses occurring in the two streams during defined periods.

References Cited in the file of this patent

UNITED STATES PATENTS 2,783,647     Stuart _____ Mar. 5, 1957